(12) United States Patent
Lynch

(10) Patent No.: US 10,002,531 B2
(45) Date of Patent: Jun. 19, 2018

(54) METHOD AND APPARATUS FOR PREDICTING DRIVING BEHAVIOR

(71) Applicant: HERE Global B.V., Veldhoven (NL)

(72) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 78 days.

(21) Appl. No.: 14/566,346

(22) Filed: Dec. 10, 2014

(65) Prior Publication Data

US 2016/0171885 A1  Jun. 16, 2016

(51) Int. Cl.
| | |
|---|---|
| G08G 1/01 | (2006.01) |
| G08G 1/0968 | (2006.01) |
| G01C 21/26 | (2006.01) |
| G08G 1/0967 | (2006.01) |

(52) U.S. Cl.
CPC .......... *G08G 1/0129* (2013.01); *G01C 21/26* (2013.01); *G08G 1/012* (2013.01); *G08G 1/0112* (2013.01); *G08G 1/0145* (2013.01); *G08G 1/096716* (2013.01); *G08G 1/096725* (2013.01); *G08G 1/096758* (2013.01); *G08G 1/096775* (2013.01); *G08G 1/096822* (2013.01); *G08G 1/096838* (2013.01)

(58) Field of Classification Search
None
See application file for complete search history.

(56) References Cited

U.S. PATENT DOCUMENTS

| | | | |
|---|---|---|---|
| 9,812,014 B2* | 11/2017 | Otake | G08G 1/13 |
| 2008/0071465 A1* | 3/2008 | Chapman | G08G 1/0129 |
| | | | 701/117 |
| 2008/0120025 A1* | 5/2008 | Naitou | G01C 21/12 |
| | | | 701/33.7 |
| 2009/0005929 A1* | 1/2009 | Nakao | B60T 7/22 |
| | | | 701/33.4 |
| 2009/0292413 A1* | 11/2009 | Kubotani | G08G 1/162 |
| | | | 701/96 |

(Continued)

FOREIGN PATENT DOCUMENTS

JP       H1199849       *   4/1999

OTHER PUBLICATIONS

Yamamura, Machine translation of JPH1199849, Apr. 1999, espacenet.com.*

(Continued)

*Primary Examiner* — John Olszewski
*Assistant Examiner* — David P. Merlino
(74) *Attorney, Agent, or Firm* — Ditthavong & Steiner, P.C.

(57) ABSTRACT

An approach is provided for predicting driving behavior. A prediction platform determines driving characteristic information for one or more vehicles in association with a segment of a travel path navigated by each of the one or more vehicles. The prediction platform also processes driving characteristic information to determine one or more response types, one or more behavior types, or a combination thereof associated with the segment of the travel path and associates the one or more response types, the one or more behavior types, or a combination thereof with mapping information for specifying the segment of the travel path, a behavior connection link-chain, or a combination thereof.

20 Claims, 14 Drawing Sheets

(56) References Cited

U.S. PATENT DOCUMENTS

| | | | |
|---|---|---|---|
| 2012/0089423 A1* | 4/2012 | Tamir | G08G 1/096791 701/1 |
| 2014/0162219 A1* | 6/2014 | Stankoulov | G09B 19/167 434/65 |
| 2015/0073620 A1* | 3/2015 | Matsumura | B60W 30/143 701/1 |
| 2015/0217775 A1* | 8/2015 | Ono | B60W 20/12 701/1 |
| 2015/0266455 A1* | 9/2015 | Wilson | G08G 1/0112 701/93 |
| 2015/0309512 A1* | 10/2015 | Cudak | G08G 1/0129 701/23 |

OTHER PUBLICATIONS

Langer, A Behavior-based System for Off-road Navigation, Dec. 1994, IEEE Transactions of Robotics and Automation, vol. 10 No. 6, pp. 776-783, http://ieeexplore.ieee.org/abstract/document/338532/ (Year: 1994).*

* cited by examiner

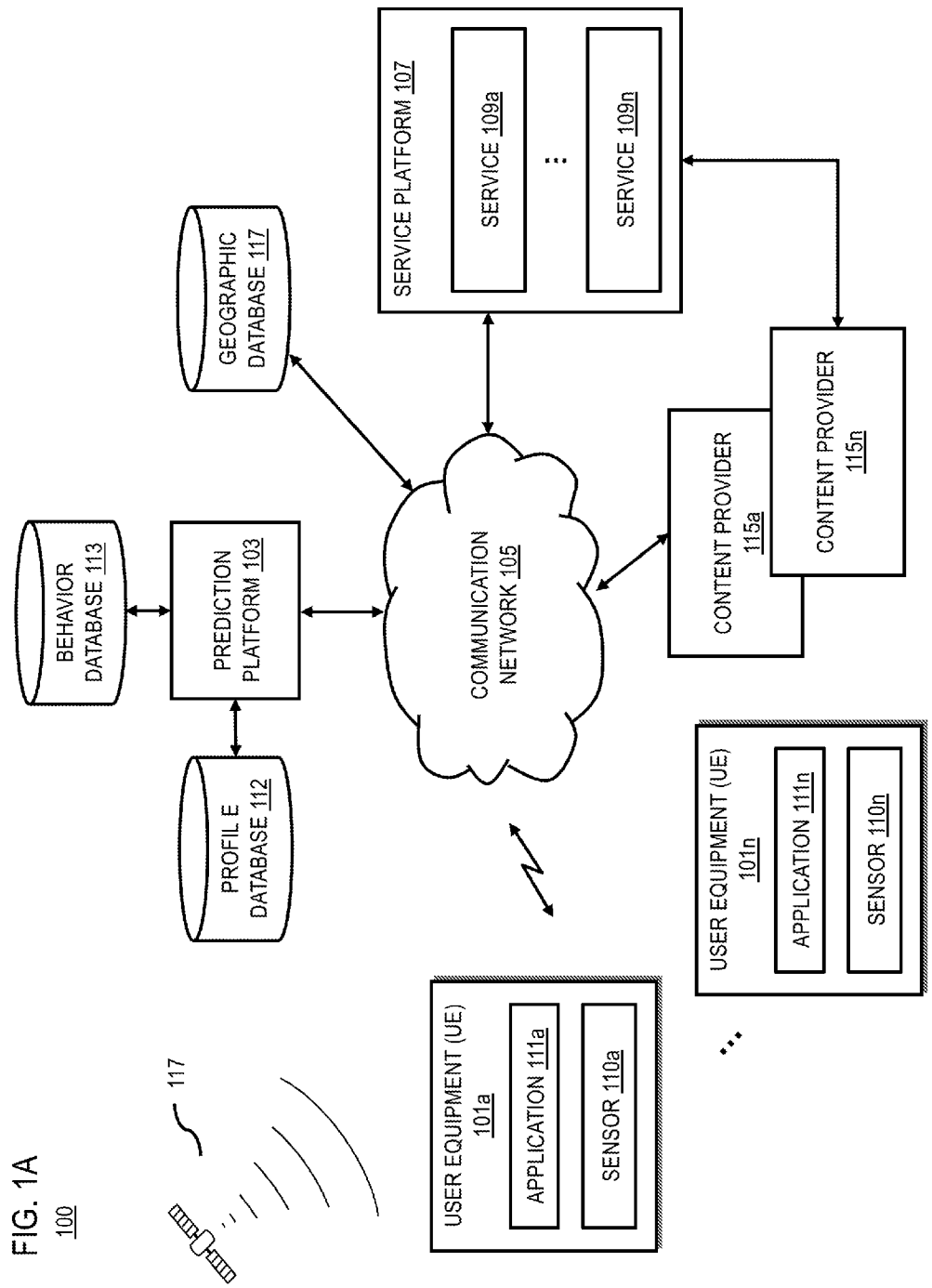

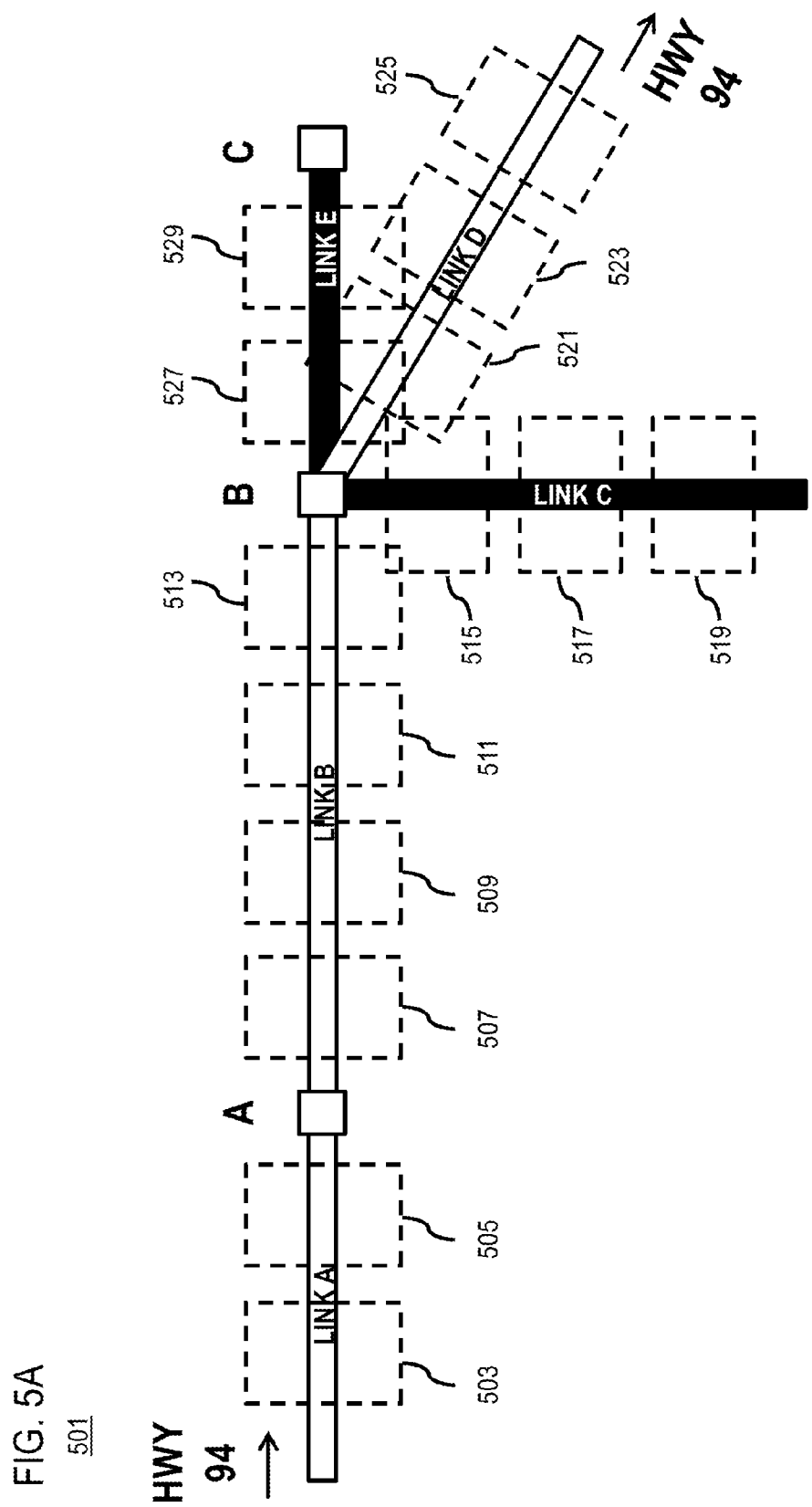

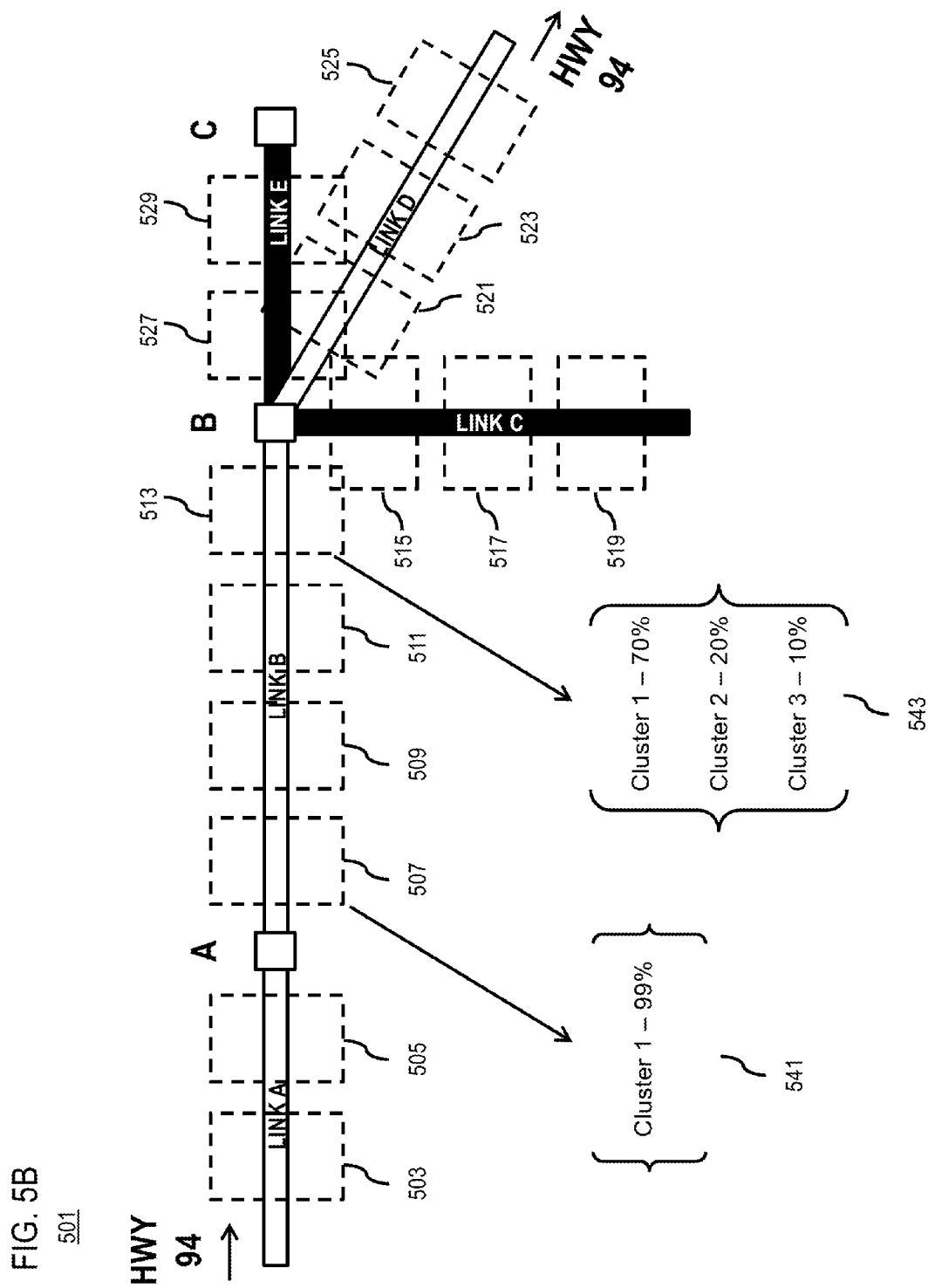

METHOD AND APPARATUS FOR PREDICTING DRIVING BEHAVIOR

BACKGROUND

Service providers and device manufacturers (e.g., wireless, cellular, etc.) are continually challenged to deliver value and convenience to consumers by, for example, providing compelling network services. One area of interest has been the development of navigation services for enhancing the autonomous driving capabilities of vehicles. To be effective, autonomous and assisted driving applications must rely on data regarding the terrain they are travelling as well as be able to anticipate driving patterns. Typically, these systems employ various onboard sensors such as speed, distance and location sensors to gather and analyze real-time data regarding the environment and other vehicles. Unfortunately, the sensors are not always sufficient for predicting how the vehicle should react in advance of encountering a specific location or driving scenario.

SOME EXAMPLE EMBODIMENTS

Therefore, there is a need for an approach for predicting driving behavior.

According to one embodiment, a method comprises determining driving characteristic information for one or more vehicles in association with a segment of a travel path navigated by each of the one or more vehicles. The method also comprises processing and/or facilitating a processing of the driving characteristic information to determine one or more response types, one or more behavior types, or a combination thereof associated with the segment of the travel path. The method further comprises associating the one or more response types, the one or more behavior types, or a combination thereof with mapping information for specifying the segment of the travel path, a behavior connection link-chain, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine driving characteristic information for one or more vehicles in association with a segment of a travel path navigated by each of the one or more vehicles. The apparatus is also caused to process and/or facilitate a processing of the driving characteristic information to determine one or more response types, one or more behavior types, or a combination thereof associated with the segment of the travel path. The apparatus is further caused to associate the one or more response types, the one or more behavior types, or a combination thereof with mapping information for specifying the segment of the travel path, a behavior connection link-chain, or a combination thereof.

According to another embodiment, a computer-readable storage medium carries one or more sequences of one or more instructions which, when executed by one or more processors, cause, at least in part, an apparatus to determine driving characteristic information for one or more vehicles in association with a segment of a travel path navigated by each of the one or more vehicles. The apparatus is also caused to process and/or facilitate a processing of the driving characteristic information to determine one or more response types, one or more behavior types, or a combination thereof associated with the segment of the travel path. The apparatus is further caused to associate the one or more response types, the one or more behavior types, or a combination thereof with mapping information for specifying the segment of the travel path, a behavior connection link-chain, or a combination thereof.

According to another embodiment, an apparatus comprises means for determining driving characteristic information for one or more vehicles in association with a segment of a travel path navigated by each of the one or more vehicles. The apparatus also comprises means for processing and/or facilitating a processing of the driving characteristic information to determine one or more response types, one or more behavior types, or a combination thereof associated with the segment of the travel path. The apparatus further comprises means for associating the one or more response types, the one or more behavior types, or a combination thereof with mapping information for specifying the segment of the travel path, a behavior connection link-chain, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system for predicting driving behavior, according to one embodiment;

FIGS. 5A and 5B are diagrams for depicting interaction between the prediction platform and a vehicle navigating along a travel path, according to various embodiments;

DESCRIPTION OF SOME EMBODIMENTS

Figure 1B:
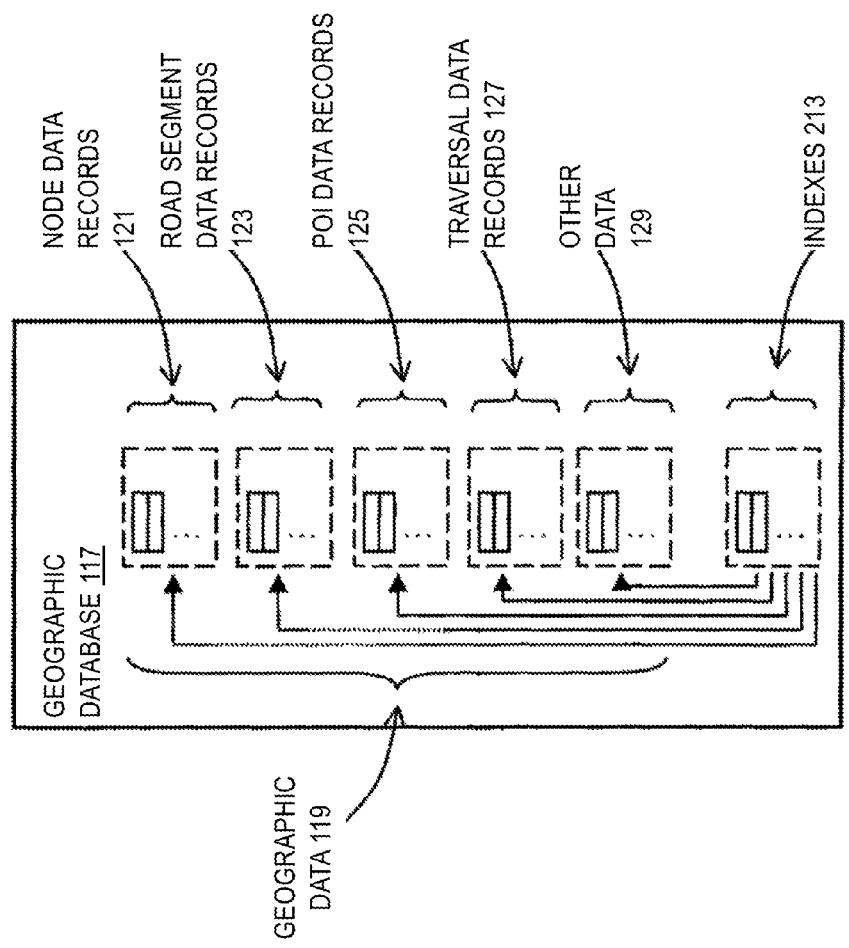
FIG. 1B is a diagram of a geographic database, according to one embodiment

Examples of a method, apparatus, and computer program for predicting driving behavior are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to autonomous vehicles, it is contemplated that the exemplary methods and systems described herein may be used in connection with any other location based service or application that relies on such data. This may include, for example, beacon or tracking systems, navigation and mapping systems, pattern recognition systems and any other like systems.

FIG. 1A is a diagram of a system for predicting driving behavior, according to one embodiment. For the purpose of illustration herein, driving behavior may pertain to any action, response or behavior exhibited (or to be exhibited) by a vehicle based on its current location, the navigation environment, the vehicle or driver status, etc. This may include, for example, a turning of the vehicle, a stoppage of the vehicle, a changing of acceleration of the vehicle, a changing of an operational mode of the vehicle (e.g., cruise control, manual drive mode, autonomous mode), an activation or deactivation of a function of the vehicle (e.g., high beam lights, windshield wipers), etc. It is noted that the driving behaviors may be classified as one or more response or behavior types for specifying a response of the vehicle to a given stimuli as it along a travel path (e.g., a roadway, highway).

As discussed previously, service providers and device manufactures are increasingly interested in developing accurate, data rich, location-based services and navigation services that improve the overall driving experience. Similarly, the effectiveness of the data relied upon by the location-based service and/or navigation service directly impacts the ability of an autonomous vehicle to operate effectively. For example, autonomous vehicles typically employ onboard navigation systems for interacting with a global positioning service, mapping service or the like to receive relevant location information, driving instructions, traffic information and other data for supporting independent navigation of the vehicle. In addition, the vehicles may rely on various sensors for perceiving its environment, including presence and/or proximity sensors, weather and road condition sensors, speed detection sensors, light intensity sensors, etc. Based on this data, the navigation system may execute various driving behaviors (e.g., initiate a turn, accelerate, brake) relative to the travel path upon which it is navigating.

Unfortunately, current navigation systems and others such systems that are reliant upon location-based information are limited in their ability to enable predictive (versus near real-time) execution of a driving behavior. Currently, the location information and sensor information gathered is not sufficient to enable the navigation system to predict how the vehicle should respond to an upcoming location along the travel path. Resultantly, the vehicle is unable to predicatively adjust its driving behavior prior to reaching this location.

To address this issue, system 100 of FIG. 1 enables navigation systems, i.e., as used by an autonomous vehicle, to predict a driving behavior of the vehicle with respect to a certain location along the travel path based on historic driving behavior data. As such, the driving behaviors exhibited by the vehicle or other vehicles that navigated the same travel path in the past may be accounted for by the navigation system in order to affect a current and future driving behavior of the vehicle. In addition, the system 100 enables a grouping, classifying and/or interrelating of various driving behaviors with specific segments of a travel path (e.g., roadway) for enabling the predicting of future driving behaviors of the vehicle or other vehicles at that segment.

In one embodiment, a prediction platform 103 interfaces with one or more user equipment (UE) 101a-101n (also collectively referred to as UE 101) configured with one or more navigation applications 111a-111n (also collectively referred to as applications 111). The UE 101 may correspond to an onboard navigation system of a vehicle, a mobile device associated with a driver, or the like. The navigation applications 111 of the UE 101 acquire navigation information, location information, mapping information or the like regarding the current travel path of the vehicle.

In addition, the navigation applications 111 may interact with various sensors 110a-110n (also collectively referred to as sensors 110) for receiving and analyzing data regarding the vehicle, the user, other vehicles, conditions regarding the driving environment, etc. By way of example, sensors 110 (e.g., of a mobile device or embedded within the vehicle) may be used as GPS receivers for interacting with one or more satellites 117 for determining speed, position and location data associated with a vehicle. In addition, the sensors may gather tilt data (e.g., a degree of incline or decline of the vehicle during navigation), motion data, light data, sound data, image data, weather data, temporal data and the like associated with the vehicles and/or UEs 101 thereof. Still further, the sensors 110 may detect local or transient network and/or wireless signals, such as those transmitted by nearby devices during navigation of a vehicle along the travel path. This may include, for example, network routers configured within a premise (e.g., home or business), another UE 101 or vehicle or a communicable traffic system (e.g., traffic lights, traffic cameras, traffic signals, digital signage). It is further noted, in certain implementations, that the sensors 110 may correspond to, or operate in connection with, the sensors 110 of the vehicle for enabling data exchange and interaction. This exchange may be facilitated by way of any known or still developing range based or wireless communication protocols.

As will be discussed further, the prediction platform 103 enables the user equipment 101 to execute driving decisions based, at least in part, on the current sensor data as well as prior collected driving behavior data (e.g., types of responses or behaviors exhibited by drivers) for a specific segment of a travel path. For the purpose of illustration herein, the travel path may include any network of links (e.g., roadways, highways, terrain) or nodes (e.g., points of beginning, terminating or intersecting of a link) for enabling vehicular travel. As such, a single stretch of roadway, highway or terrain may comprise multiple different links and nodes. Also, links may be further segmented or partitioned, such as to represent a stretch of road at a time. For example, a link having an end-to-end (or node-to-node) length of L meters may comprise a number segments N, where each segment is of a length L÷N. It is noted that the segments, referred to herein as a segment of a travel path, may also be represented in terms of area or region accordingly. The exemplary embodiments herein may correspond to any known means of segmentation and/or representation of the travel path or segments thereof.

In one embodiment, the prediction platform 103 monitors and collects data, referred to herein as driving characteristic information, for specifying one or more driving behaviors exhibited by one or more vehicles for a specific segment of the travel path. The driving characteristic data may include, for example, acceleration information, velocity information, heading information, bearing information, orientation information, curvature information, tilt information, or the like for a specific vehicle. In addition, the driving characteristic information may include data for specifying a function or operation of the vehicle, such as steering information, pedal usage information, wiper usage information, headlight usage information, navigation system usage information, stereo system usage information, vehicle state information, or a combination thereof. It is noted that a set, or cluster, of the above described driving characteristic information may be collected for representing a multi-variable state of driving behavior at a given segment of the travel path. The prediction platform 103 stores the gathered sets (clusters) of driving characteristic information to a behavior database 113 for subsequent analysis.

In one embodiment, the prediction platform 103 analyzes the driving characteristic information to determine the driving behavior exhibited by the vehicle associated with the UE 101 (e.g., the vehicle equipped with a navigation system). Per this approach, each set or cluster of driving characteristic information may be further classified as representing a response type or behavior type for a specific segment of the travel path. The prediction platform 103 may employ evaluation criteria for analyzing respective sets of data to determine the classification. It is noted that the criteria for evaluating the behavior characteristic data, which may include variance thresholds, discrepancy factors and other metrics, may be established by the prediction platform 103, a provider of the navigation system or service associated with the vehicle, a provider of the application 111 or location-based service, or the like.

By way of example, a set of data corresponding to a segment of highway featuring an exit ramp may specify the following: data for indicating a decrease in acceleration, a decline in tilt, a change in curvature and heading, an applied amount of brake pressure, an activation of the brake lights, etc., to within a predetermined threshold or variance factor. Under this scenario, the prediction platform 103 may determine this corresponds to an EXIT behavior of the vehicle from the highway, i.e., by way of a downward, curved, exit ramp that connects to a street. In contrast, a steady or increased acceleration of the vehicle with limited to no change in curvature or tilt, limited to no brake pressure or brake light activation for the same segment of highway may be determined as CONTINUED DRIVING behavior of the vehicle along the highway. As such, per the analysis, the prediction platform 103 may store the classification of the data set, or cluster, to the behavior database 113 in association with the data set.

It is noted, therefore, that a single segment of a travel path may have associated therewith one or more different classifications, each representing a different behavior and/or response types associated with that segment. Consequently, each behavior and/or response type corresponds to a decision and/or action capable of being executed by a vehicle that is approaching the same segment of the travel path. By determining the potential decision and/or action in advance of arriving at a specified segment of the travel path, various preemptive decisions and/or actions may be executed. Thus, the prediction platform 103 may support the execution of preemptive instructions based on the predicted behavior and/or response types associated with an impending segment of the travel path to be navigated by the vehicle.

In one embodiment, the prediction platform 103 records and links each behavior and/or response type determined to the specific location and/or segment along the travel path. As such, the prediction platform 103 is able to identify the number of decisions and/or actions a vehicle may execute at a specific segment of the travel path as well as determine the relationship between respective successively linked segments. For example, in the case of a stretch of highway featuring a relatively straight (non-curved) geometry, successive segments will be associated with a single behavior of CONTINUED DRIVING (e.g., straight and constant speed). However, at a point of increased curvature of the highway or the presence of a toll booth for an upcoming segment, two different behaviors and/or response types of REDUCED SPEED or COMPLETE STOP may be determined. Still further, a segment featuring an exit ramp may be associated with the CONTINUED DRIVING or EXIT RIGHT behavior and/or response type. Thus, the prediction platform 103 may readily identify changes in behavioral responses, and thus, predictive actions to be taken from one segment to the next.

Still further, the prediction platform 103 is able to maintain a history of driving characteristic data that is further classified into one or more distinct response types, behavior types, or a combination thereof for a given segment of the travel path. In this way, the prediction platform 103 associates specific behavior and/or response types to specific geometric features of the roadway, environmental conditions, population densities, events or the like. Also, in certain embodiments, the collection of interconnected segments may be utilized by the prediction platform 103 to generate a characterization of the entire travel path. This characterization is based on analysis of the respective classifications of the segments as a whole. For example, in the case where (1) a majority of segments of the road correspond to REDUCED SPEED or COMPLETE STOP; (2) the travel path includes many hills and curved routes; (3) is located adjacent to a large body of water; or (4) some other combination of characteristics, the characterization may correspond to SCENIC ROUTE. It is noted that the characterization is based on collected data as opposed to, or in conjunction with, feedback information from drivers regarding the travel path. Furthermore, the characterization is based on known relationships (links) between respective sets, or clusters, of driving characteristic data relative to the travel path to be navigated.

In one embodiment, in addition or alternatively to associating specific behaviors and/or response types to geometric features, the prediction platform 103 may connect or associate the specific behaviors and/or response types to each other without reference or connection to their spatial link. In other words, the prediction platform 103 may operate in a mode that is behavior-based and independent of the spatial or road-network. The prediction platform 103, for instance, creates a connection link-chain of behaviors using observed driving behavior by linking what next behaviors are observed, expected, and/or predicted given an initial behavior. The behavior connection link-chain is then used to predict a likely set of behaviors (and by proxy a likely path based on those behaviors) that a vehicle with an initial behavior will have. For example, if current vehicle behavior indicates that the vehicle is slowing down and veering to the right, and such behavior has been previously linked to another behavior such as taking the next ramp, the prediction platform 103 can use a behavior connection-link to predict that the vehicle is likely to take the next ramp based on matching the current behavior, even if the prediction platform 103 has not consulted mapping information to determine whether an exit ramp is coming up. In one embodiment, as the behavior connection-link is expanded to multiple linked behaviors, the prediction platform 103 can estimate and make predictions further into the future.

In one embodiment, per the above described approaches, that the determined behavior type, response type, characterization, or the like may be determined based on periodic or continual analysis of driving characteristic data each segment of the travel path. As previously noted, the response type can be determined based on spatial-links and/or behavioral links. Furthermore, the analysis may be performed based on the collection of data sets for different vehicles having UE 101 that is configured to interact with the prediction platform 103 via a communication network 105. The prediction platform 103 may be configured to perform the analysis according to a predetermined schedule, based on a minimum number of determined driving characteristic data sets, or a combination thereof.

In one embodiment, the prediction platform 103 associates the driving characteristic data and associated one or more response and/or behavior types for each segment with related mapping information and/or the behavior connection link-chain discussed above. The mapping information may include data corresponding to, or representative of, the respective segments of the travel path within a geographic range. Similarly, the behavior connection link-chain stores connection among vehicle behaviors independent of the mapping data or road network. By way of example, image or textual content, location coordinates, point of interest information, navigation instructions or any other data representative of or related to a segment of the travel path may be associated with its corresponding behavior and/or response type(s). Under this scenario, the prediction platform 103 may be configured to interface directly with a service platform 107 for accessing various location based services 109a-109n (also collectively referred to as services 109) and content associated therewith. In addition, the prediction platform 103 may interface with one or more content providers 115a-115n (also collectively referred to as content providers 115) that provide/deliver content of various types and genres (e.g., navigation content, travel content, locality content, marketing content) upon request.

As will be discussed in further detail later on herein, the prediction platform 103 may also interface with a geographic database 117 that maintains relevant mapping information. While not shown expressly in FIG. 1, the service platform 107 and content providers 115 may also interact with the geographic database for retrieving content, maps, waypoint data, point of interest data and other information related to or representative of a travel segment, its surrounding environment, etc.

In one embodiment, the prediction platform 103 associates the driving characteristic information, associated response and/or behavior types, or a combination thereof with mapping information or the behavior connection link-chain in various ways. For example, the prediction platform 103 may upload the contents of the behavior database 113 from the prediction platform 103 to the service platform 107 or the content providers 115 on a periodic basis, i.e., in accordance with a service arrangement. Per this arrangement, the content providers 115 and service providers establish a profile (register) for accessing the prediction platform 103 as a hosted solution or cloud based service. Similarly, the contents of the behavior database 113 (e.g., storing the behavior connection link chain) may be uploaded to a geographic database.

Alternatively, the prediction platform 103 may operate in direct connection with a respective service 109, content provider 115 or geographic database for fulfilling a navigation request initiated by the application 111. For example, in the case where the UE 101 is a navigation system that submits a routing request, the prediction platform 103 retrieves the mapping information and/or content that meets the request criteria. It then integrates the mapping information with the behavior characteristic information accordingly. As such, textual descriptors regarding the behavior and/or response types may be specified audibly along with turn-by-turn navigation instructions (e.g., "Expect to make a hard right at Exit 37/Leo Road.").

In the case where the request is for visual content to be rendered to a display, visual elements for depicting the segments of the travel path or textual descriptors regarding the behavior and/or response types may be presented accordingly. Per this scenario, as the vehicle approaches an exit ramp along the travel path to within a predetermined distance, two behaviors and/or response types corresponding to the exit may appear. A first behavior and/or response type may be for indicating CONTINUED DRIVING while the second may be for indicating EXIT SLIGHT RIGHT. In one embodiment, the response type may be another behavior type that forms a behavior connection-link chain.

It is noted that the visual elements, which may include text, icons, or other graphics primitives, are only rendered to the display of the navigation system as necessary. For instance, when the exit ramp being approached by the vehicle is unrelated to the fulfillment of the navigation instructions or not related to reaching the final destination point, the visual elements need not be presented. In the case, however, where the vehicle is an autonomous vehicle, the prediction platform may (optionally) instruct the navigation system to present each of the visual elements for depicting the various segments and associated behaviors and/or responses accordingly. As such, the user is able to view the "predicted" behavior or response type, and thus corresponding action or instruction to be taken by the navigation system, in association with the ensuing segment of the highway. Based on this feedback, the user may then decide to switch from hands free to manual driving mode in response to the predicted/pending/upcoming behavior and/or response type.

In one embodiment, the prediction platform 103 may further transmit a driving instruction to the application 111 for affecting the operation of the vehicle based on the behavior and/or response type associated with the pending/upcoming segment of the travel path. The prediction platform 103 may determine a likelihood of occurrence, a popularity, a probability, or other metric to associate with a given behavior and/or response type in order to determine the most relevant or best fit instruction to execute. For example, when an upcoming segment of the travel path is associated with four different types of responses and/or behaviors (decision points), the single instruction to be executed may be determined based on which decision point has the highest frequency of occurrence. In the case of an autonomous vehicle, an instruction to slow the vehicle down may be executed by the navigation system in advance of the vehicle reaching the corresponding segment of the travel path. Hence, current actions may be executed, prioritized, or queued for initiation based on the predicted behavior and/or response type. Still further, the behavior and/or response type may be associated with one or more data sets, or clusters thereof, for indicating prior collected curvature data, reduced speed statistics, lane reduction details and other characteristics associated with the segment for supporting the decision making process.

In one embodiment, the prediction platform 103 is able to recall the history of a specific driver or vehicle based on profile information maintained per database 112 for that driver or vehicle. As such, a navigation request from a UE 101 of a vehicle may be cross referenced against prior collected driving characteristic data for that vehicle. The prediction platform 103 may also determine which segments of the travel path the vehicle has navigated in the past. Based on this information, the prediction platform 103 is then able to determine a best response and/or behavior to be executed (i.e., as an instruction). Hence, the prediction platform 103 generates instructions based on the historical driving behavior characteristics of other vehicles as well as its own for responding to an impending segment of the travel path.

Still further, a first behavior and/or response type may be identified as relating to a second behavior and/or response type by observing which vehicles were associated with the first behavior and/or response type. As such, a best fit instruction or decision point may be determined for a vehicle approaching the corresponding segment of the travel path by searching successive behavior and/or response types (e.g., as stored in the behavior connection link-chain of the behavior database 113) to identify which contains the highest occurrences of the same vehicle. For example, in the case where it is observed that 90% of the vehicles decelerated prior to preceding to the segment of a highway featuring an exit ramp of, an instruction to exit may be generated. It is contemplated, in future embodiments, that this information may be shared with third party analytic services, auto insurance providers or the like for future analysis.

It is noted that the prediction platform 103 may be configured to operate in connection with any known navigation system for enabling the initiation of instructions to be executed by the vehicle, by a driver of the vehicle, or a combination thereof. This may include, for example, autonomous vehicles having an embedded UE 101. Under this scenario, the autonomous vehicle may communicate with other autonomous vehicles configured to interact with the prediction platform 103. As such, the prediction platform 103 may determine optimal driving behaviors and/or responses for the vehicles based on current sensor information, coordinate driving maneuvers for the vehicles, or the like with respect to a current or next segment of a travel path navigated by the vehicles.

By way of example, the prediction platform 103 may be implemented as a cloud based service, hosted platform or the like for exchanging as well as receiving information from the services 109, providers 115 or applications 111. Alternatively, the prediction platform 103 may be directly integrated for processing data generated and/or provided by the services 109, providers 115 or applications 111. Per this integration or interface, the prediction platform 103 may translate location based information, navigation related content or the like as generated and exchanged during a navigation session into useful data for predicting driving behavior.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, prediction platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of a geographic database, according to one embodiment. In one embodiment, geographic data 119 regarding the travel path may be stored, associated with, and/or linked to prediction platform 103 by way of the geographic database 117. The geographic or map database 117 includes geographic data 119 used for (or configured to be compiled to be used for) navigation-related services. For example, the geographic database 117 may include node data records 121, road segment or link data records 123, POI data records 125, traversal data records 127, other data records 129, and indexes 213 to the geographic data 201. More, fewer, or different data records may be provided. In one embodiment, the other data records 129 include cartographic ("carto") data records, routing data, and maneuver data.

In one embodiment, the road segment data records 123 are links or segments representing roads, streets, or paths. The node data records 121 are end points corresponding to the respective links or segments of the road segment data records 123. The road link data records 123 and the node data records 121 represent a road network, such as used by vehicles, cars, and/or other entities. Alternatively, the geographic database 117 contains travel path segment and node data records or other data that represent pedestrian paths, vehicular paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 may include data about the POIs and their respective locations in the POI data records 125. The geographic database 117 may also include data about places, such as cities, towns, or other communities, and other geographic features, such as bodies of water, mountain ranges, etc. Such place or feature data may be part of the POI data 125, such as a data point used for displaying or representing a position of a city. In addition, the geographic database 117 may include data about location-based events and their respective locations in the event data records 123. By way of example, the location-based events include any type of event that is associated with a particular location including, for instance, traffic, accidents, construction, public gatherings, etc.

In one embodiment, the geographic database 117 may include trajectory data records 209 for determining trajectory paths through a transportation structure. For example, the traversal data records 127 may include sensor data collected from UEs 101 that contain location traces through one or more transportation structures. The traversal data records 127 may also store the baseline paths determined by the prediction platform 103 as well as the results of classifying other location traces with respect to the baseline paths. In yet another embodiment, the traversal data records 127 include the results of additional analytics for indicating the flow of traffic through transportation structures, the volume of traffic flows through the structures and the like. In some embodiments, the traversal data records 127 can be further segmented or categorized according to one or more contextual parameters (e.g., temporal parameters, mode of transport parameters, vehicle type).

The geographic database 117 may be maintained by the content provider 111 (e.g., a map developer) or the provider of the services 109. By way of example, the content providers or service providers may employ different approaches for generating and/or storing the geographic data. This may include, for example, obtaining data from other sources, such as municipalities or respective geographic authorities. In addition, the providers may employ field personnel to travel by vehicle along roads throughout a geographic region in order to observe features and/or record information descriptive of a travel path, its surrounding environment, etc. Also, the providers may employ remote sensing, such as aerial or satellite photography.

The geographic database 117 may be a master geographic database stored in a format that facilitates updating, maintenance and development. For example, the master geographic database 117 or data in the master geographic database 119 may be generated according to an Oracle spatial format or other spatial format for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation system. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 117 may be a master geographic database, but in alternate embodiments, the database may represent a compiled navigation database that may be used in or with UE 101 to provide navigation or map-related functions. For example, the database 117 may be used with the UE 101 to provide a vehicle with navigation features. In such a case, the database may be downloaded or stored on the UE 101, or the UE 101 may access the database 117 through a wireless or wired connection (such as via a server and/or network 105).

In one embodiment, the UE 101 may be an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the UE 101 is a cellular telephone for executing the application 111 to present guidance information and map displays. It is contemplated, in future embodiments, that the cellular telephone may be interfaced with an on-board navigation system of an autonomous vehicle or physically connected to the vehicle for serving as the navigation system.

Figure 2:
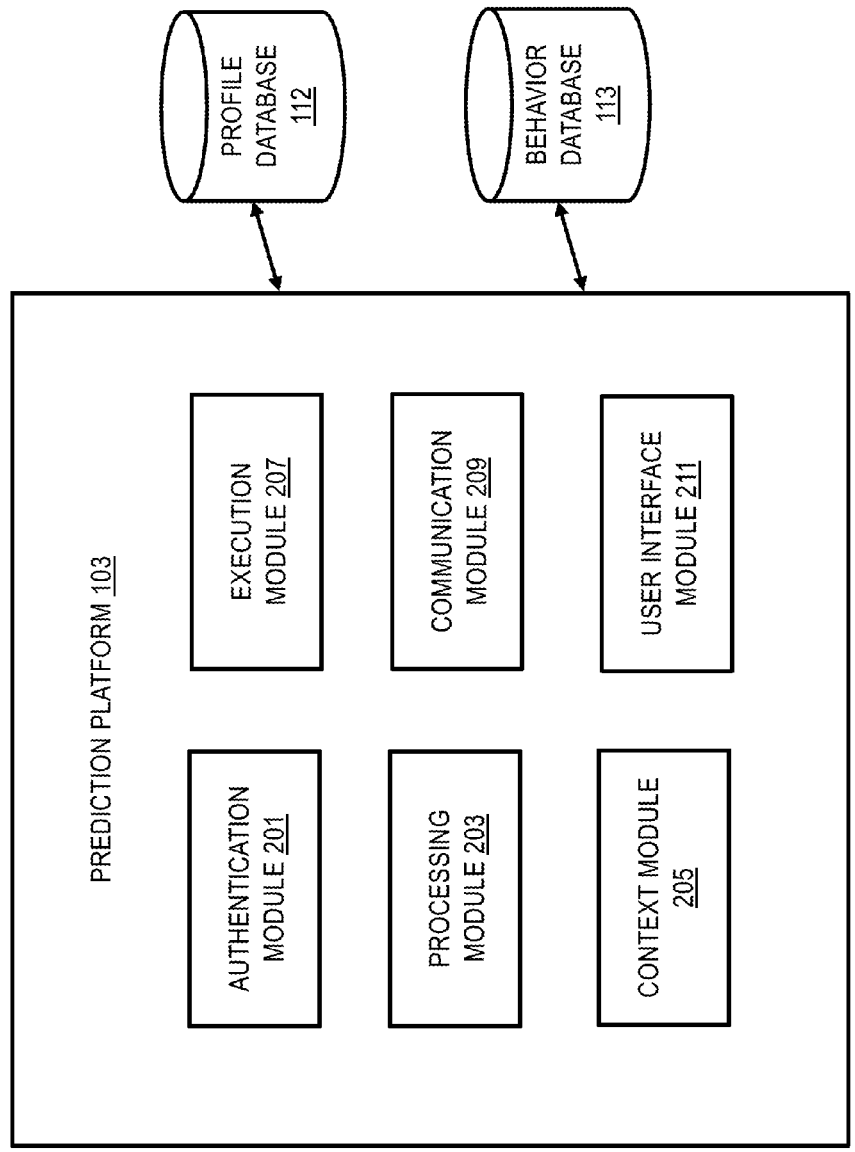
FIG. 2 is a diagram of the components of a prediction platform, according to one embodiment.
Figure 3B:
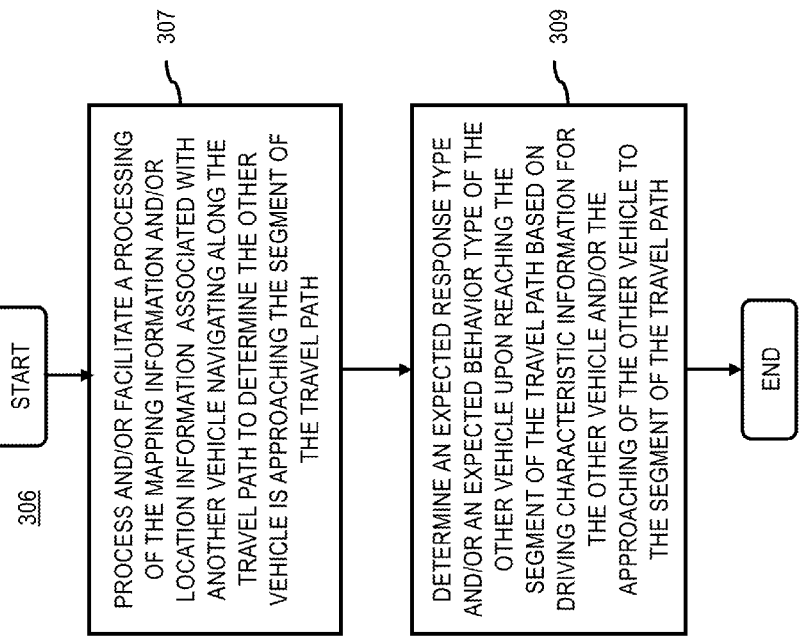
FIGS. 3A, 3B, 4A and 4B are flowcharts of processes for predicting driving behavior, according to various embodiments.
Figure 3A:
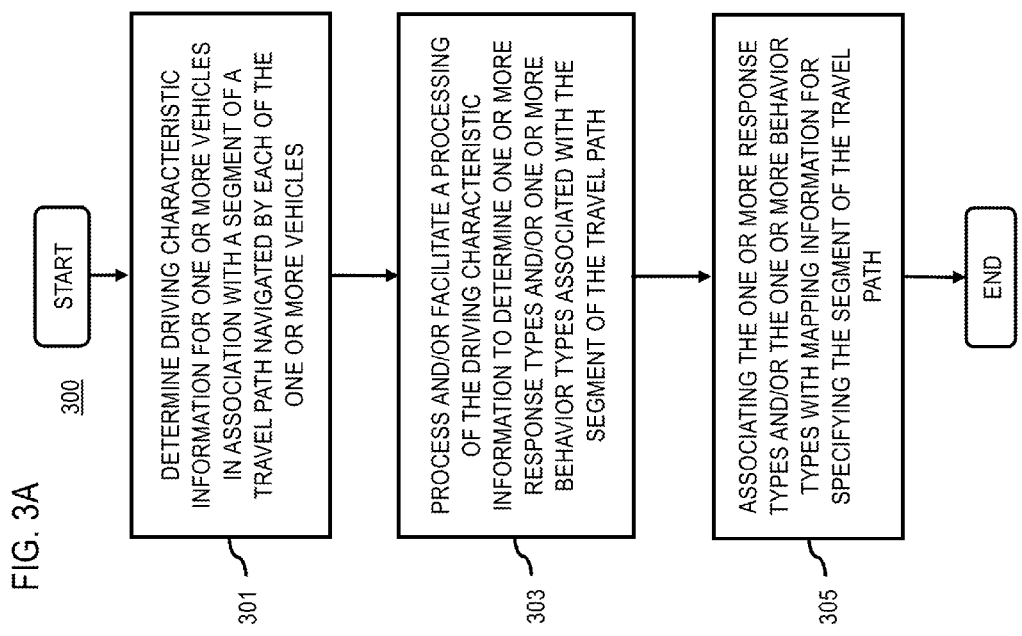
Figure 4A:
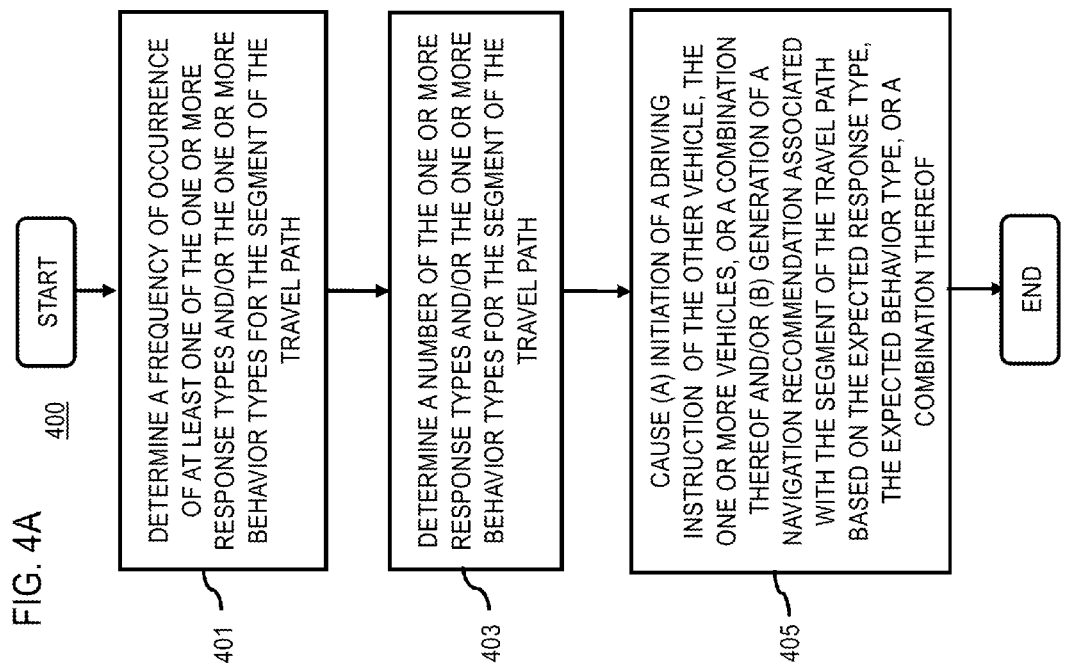
Figure 4B:
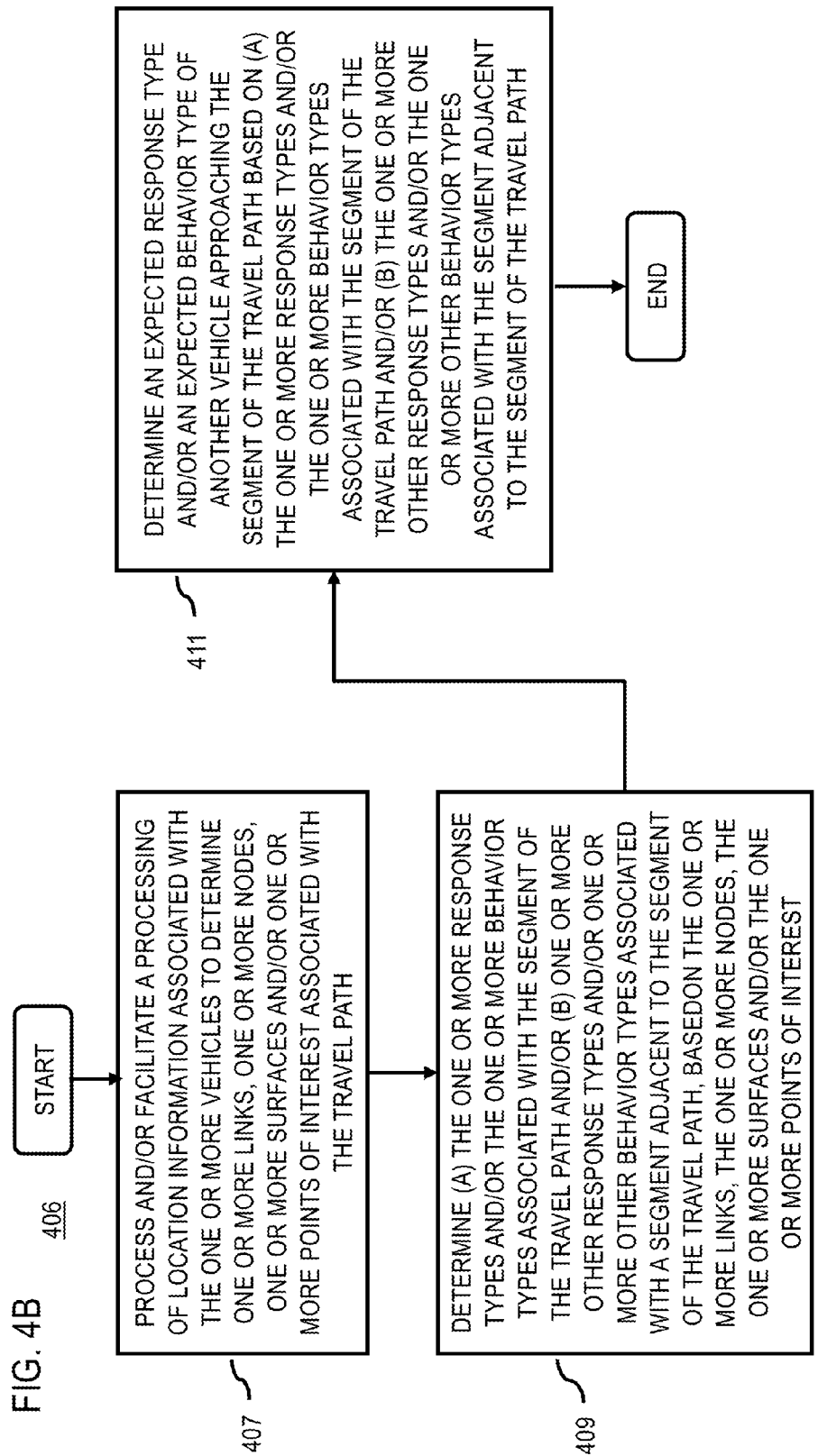

FIG. 2 is a diagram of the components of a prediction platform, according to one embodiment. By way of example, the prediction platform 103 includes one or more components predicting driving behavior. It is contemplated that the functions of these components may be combined in one or more components or performed by other components of equivalent functionality. In this embodiment, the prediction platform 103 includes an authentication module 201, a processing module 203, a context module 205, a determination module 207, a communication module 209 and a user interface module 211.

The authentication module 201 authenticates users and UE 101 for interaction with the prediction platform 103. By way of example, the authentication module 201 receives a request to access the prediction platform 103 via an application 111. The request may be submitted to the authentication module 201 via the communication module 209, which enables an interface between the navigation application 111 and the platform 103. In addition, the authentication module 201 may receive a first-time subscription request from a UE 101, a request to store a profile at database 112, a permission message validating consent by a UE 101 to share contextual information with the platform 103, or a combination thereof. It is noted that the authentication module 201 may further be configured to support and/or validate the formation of profile by a provider of a service 109 or content provider 115, i.e., for supporting integration of the behavior characteristic information with other types of data.

The processing module 203 operates in connection with the context module 205 to interpret driving characteristic data (e.g., driving behavior data) associated with one or more vehicles as they navigate a travel path. The context module 203 gathers the sensor information generated by the sensors of the UE 101 for specifying the acceleration, curvature, tilt, velocity, driving mode, brake pressure, etc., while the processing module 203 evaluates this information against various criteria. The criteria may include, for example, variance thresholds, discrepancy factors and other metrics that when fulfilled, indicate a response and/or behavior type to associate with the vehicle and the corresponding segment of the travel path.

The processing module 203 also operates in connection with the authentication module 201 to retrieve and/or access location information from various services 109 of a service platform 107 or from content providers 115. This may include, for example, accessing mapping information related to a specific segment of the travel path and associating the collected driving characteristic data, the associated response and/or behavior types, or a combination thereof with the mapping information and/or behavior connection link-chain accordingly. It is noted that the mapping information and/or behavior connection link-chain may also be stored to the behavior database 113.

The execution module 207 determines an instruction, an action and/or a decision point to be executed by the vehicle based on the determined response and/or behavior types associated with a segment of the travel path. By way of example, the execution module 101 determines a likelihood of occurrence, a popularity, a probability, or other metric to associate with a given behavior and/or response type in order to determine the most relevant or best fit instruction to execute. Per this execution, current actions may be executed, prioritized, or queued for initiation at the vehicle based on the predicted behavior and/or response type.

The execution module 207 may also operate in connection with the communication module 209 and user interface module 211 to cause the transmission or rendering of an instruction respectively. By way of example, the execution module 207 may trigger the user interface module 211, which executes one or more application programming interface (API) executions of the platform 103 for presenting the segments of the travel path, the associated behavior and/or response types, etc. As another example, the execution module may trigger the communication module 209 to transmit an instruction for initiating a behavior and/or response of the vehicle, per the vehicles navigation system (e.g., UE 101), in response to the approaching of the vehicle to the corresponding segment of the travel path.

It is further noted that the user interface module 211 may operate in connection with the communication module 209 for facilitating the exchange of navigation information via the communication network 105 with respect to the services 109, content providers 115 and applications 111.

The above presented modules and components of the prediction platform 103 can be implemented in hardware, firmware, software, or a combination thereof. Though depicted as a separate entity in FIG. 1, it is contemplated that the platform 103 may be implemented for direct operation by respective UEs 101. As such, the prediction platform 103 may generate direct signal inputs by way of the operating system of the UE 101 for interacting with the application 111. In another embodiment, one or more of the modules 201-211 may be implemented for operation by respective UEs as a platform 103, cloud based service, or combination thereof.

Figure 7:
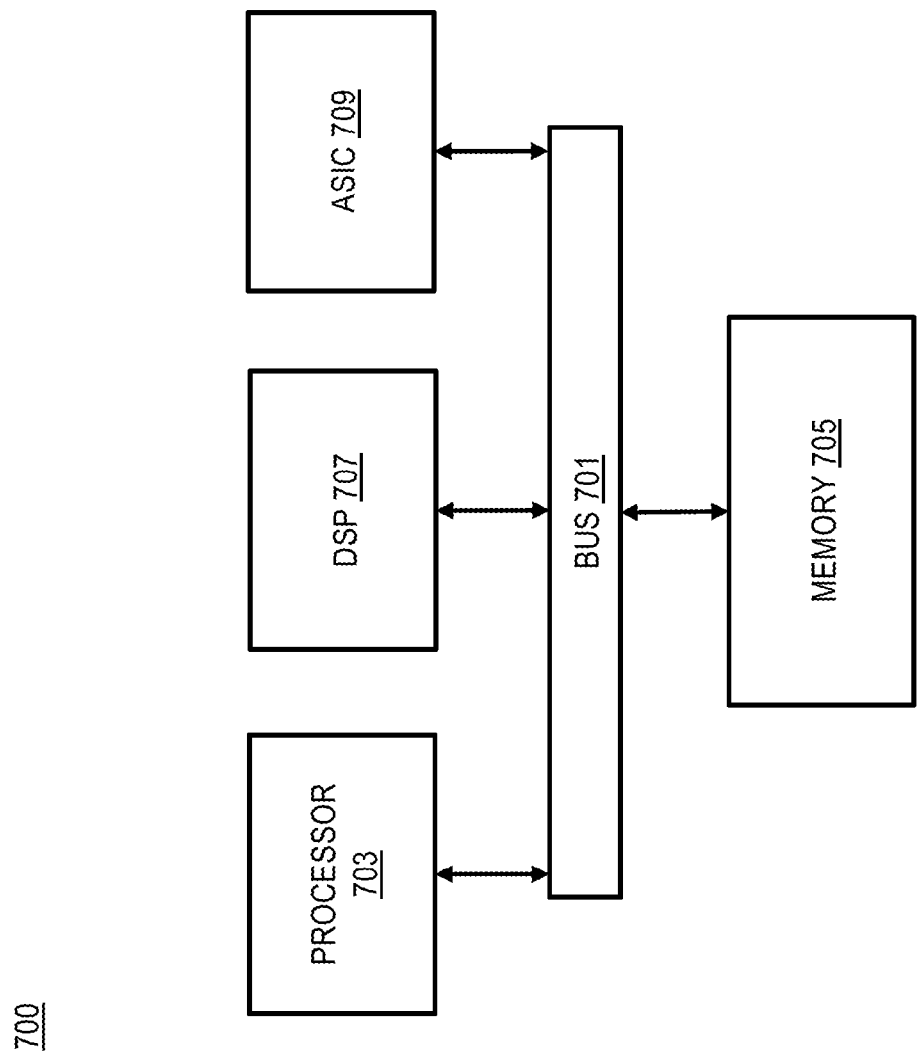
FIG. 7 is a diagram of a chip set that can be used to implement an embodiment of the invention.

FIGS. 3A, 3B, 4A and 4B are flowcharts of processes for predicting driving behavior, according to various embodiments. In one embodiment, the prediction platform 103 performs processes 300, 306, 400 and 406 and is implemented in, for instance, a chip set including a processor and a memory as shown in FIG. 7.

In step 301 of process 300, the prediction platform 103 determines driving characteristic information for one or more vehicles in association with a segment of a travel path navigated by each of the one or more vehicles. In another step 303, the prediction platform 103 processes and/or facilitates a processing of the driving characteristic information to determine one or more response types, one or more behavior types, or a combination thereof associated with the segment of the travel path. As noted previously, the driving characteristic information may include acceleration information, velocity information, heading information, bearing information, orientation information, curvature information, tilt information, steering information, pedal usage information, wiper usage information, headlight usage information, navigation system usage information, stereo system usage information, vehicle state information, or a combination thereof.

Per step 305, the prediction platform 103 associates the one or more response types, the one or more behavior types, or a combination thereof with mapping information for specifying the segment of the travel path and/or a behavior connection link-chain that is independent of the mapping information or road-network. As mentioned previously, the association may include integrating the driving characteristic information with mapping information representative of the segment of the travel path and/or behavior connection link-chain. Still further, the association may include uploading or sharing the characteristic information, the one or more determined response types and/or behavior types, with one or more third party services or content providers.

In step 307 of process 306 (FIG. 3B), the prediction platform 103 processes and/or facilitates a processing of the mapping information, location information associated with another vehicle navigating along the travel path, the behavior connection link-chain, or a combination thereof to determine the other vehicle is approaching the segment of the travel path or associated with a given set of behaviors or driving characteristics. By way of example, the other vehicle corresponds to the vehicle currently relying on historic or prior collected driving characteristic information for it or other vehicles to determine a predicted response type and/or behavior type to be associated with the vehicle.

Per step 309, the prediction platform 103 determines an expected response type, an expected behavior type, or a combination thereof of the other vehicle upon reaching the segment of the travel path based on driving characteristic information for the other vehicle, the approaching of the other vehicle to the segment of the travel path, or a combination thereof. It is noted that the expected response type, the expected behavior type, or a combination thereof is based on (a) one or more historical response types associated with the other vehicle, (b) one or more historical behavior types associated with the other vehicle, (c) the one or more response types, the one or more behavior types, or a combination thereof associated with the segment of the travel path, or (d) a combination thereof. In one embodiment, the historical information, behavior types, response types, etc. can be provided by the behavior connection link-chain independently of mapping information.

In step 401 of process 400 (FIG. 4A), the prediction platform 103 determines a frequency of occurrence of at least one of the one or more response types, the one or more behavior types, or a combination thereof for the segment of the travel path or for a specified behavior type or driving characteristics. In another step 403, the platform 103 determines a number of the one or more response types, the one or more behavior types, or a combination thereof for the segment of the travel path or specified behavior type. As noted previously, the expected response type, the expected behavior type, or a combination thereof is based on the frequency of occurrence, the number, or a combination thereof.

Per step 405, the prediction platform 103 causes, at least in part, (a) initiation of a driving instruction of the other vehicle, the one or more vehicles, or a combination thereof; (b) generation of a navigation recommendation associated with the segment of the travel path, or (c) a combination thereof based on the expected response type, the expected behavior type, or a combination thereof. Hence, the platform 103 may enable the execution of various decision points corresponding to the approaching or navigating thereof of the vehicle to the corresponding segment of the travel path or specified behavior type.

In step 407 or process 406 (FIG. 4B), the prediction platform 103 processes and/or facilitates a processing of location information associated with the one or more vehicles to determine one or more links, one or more nodes, one or more surfaces, one or more points of interest, or a combination thereof associated with the travel path. In another step 409, the platform 103 determines (a) the one or more response types, the one or more behavior types, or a combination thereof associated with the segment of the travel path, (b) one or more other response types, one or more other behavior types, or a combination thereof associated with a segment adjacent to the segment of the travel path, or (c) a combination thereof based on the one or more links, the one or more nodes, the one or more surfaces, the one or more points of interest, or a combination thereof. In addition or alternatively, the prediction platform 103 may also traverse adjacent segments or links of the behavior connection link-chain to predict an expected behavior and/or response type for a vehicle.

Per step 411, the platform 103 determines an expected response type, an expected behavior type, or a combination thereof of another vehicle approaching the segment of the travel path based on (a) the one or more response types, the one or more behavior types, or a combination thereof associated with the segment of the travel path, (b) the one or more other response types, the one or more other behavior types, or a combination thereof associated with the segment adjacent to the segment of the travel path, or (c) a combination thereof. It is noted that this corresponds to the aforementioned linking of respective clusters, or data sets, for a given segment of the travel path or a given behavior type (e.g., set of driving characteristics).

FIGS. 5A and 5B are diagrams for depicting interaction between the prediction platform and a vehicle navigating along a travel path, according to various embodiments. In FIG. 5A, the travel path 501 includes various nodes labeled A, B and C as well as various corresponding links labeled Link A, Link B, Link C, Link D and Link E. Per this example, Link A is comprised of two segments 503 and 505, Link B is comprised of four segments 507-513, Link C is comprised of three segments 515-519, Link D is comprised of three segments 521-525 and Link E is comprised of two segments 527-529. Also, for the purpose of example, Links A, B and D represent contiguous sections of a highway labeled HWY 94, while Links C and E represent a divergent pathway and an exit from HWY 94 respectively. It is noted that each of the segments 503-529 represent a segment of the travel path 501.

As depicted in FIG. 5B, each segment of the travel path 501 is associated with at least one data set, or cluster, of driving characteristic data. The driving characteristic data is collected by the prediction platform 103 and associated with the segment based on the historic driving actions of a plurality of vehicles along the travel path 501. The plurality of vehicles are configured to operate in connection with the prediction platform 103 in order to enable persistent monitoring of the acceleration, velocity, operational status, functions, or other values or status information related to the vehicle. Still further, the prediction platform enables the associating of the collected driving characteristic data for each vehicle to be associated with mapping information representative of the corresponding segment. For example, with respect to the segment of the travel path 501 represented by segment 507 at Link B, the platform 103 may associate a cluster of driving characteristic information 541 with a visual depiction of the highway at this location.

Also, the prediction platform 103 determines a response and/or behavior type to associate with each cluster. This determination may be based on evaluation criteria, such as criteria for detecting a set of data corresponds to stoppage of the vehicle versus deceleration of the vehicle. As another example, the evaluation criteria may enable the platform 103 to distinguish, based on the gathered driving characteristic data, between a sharp right turn and exit versus a slight right turn and exit. As depicted in FIG. 5B, each cluster is also assigned a score by the prediction platform 103 for indicating the likelihood or probability of execution of one behavior and/or response type (cluster) versus another.

By way of example, in the case of the data set 541 associated with segment 507, the probability of this behavior (e.g., CONTINUED DRIVING at a steady pace) is 99%. This is due to the fact that there are limited decisions to be executed by the vehicle for this particular segment of the travel path 501. In contrast, multiple possible behaviors and/or response types are associated with the data set 543 corresponding to segment 513. Under this scenario, three clusters comprise this data set 543, corresponding to three different behaviors and/or responses (decision points) capable of being executed in response to the impeding travel of a vehicle towards Node B. These include, for example, a decision to continue along Link D for proceeding along HWY 94 (cluster 1), a decision to exit HWY 94 and proceed onto LINK C (cluster 2) or a decision to pass the exit at Node B proceed straight onto Link E (cluster 3).

In this case, the highest probability score of 70% is assigned to cluster 1, while clusters 2 and 3 are assigned a score of 20% and 10% respectively. The scoring is based on the historic data collected for a plurality of vehicles by the prediction platform 103. Thus, in the case of cluster 1, the scoring indicates the preponderance of vehicles proceed along HWY 94 upon encountering the Node B. Of note, the platform 103 may detect this tendency based on historic path information for respective vehicles—i.e., by reviewing successive forward and backward behavior and/or response types associated with successive segments of the travel path. This is in addition to evaluating the driving characteristic data for the plurality of vehicles.

Figure 5C:
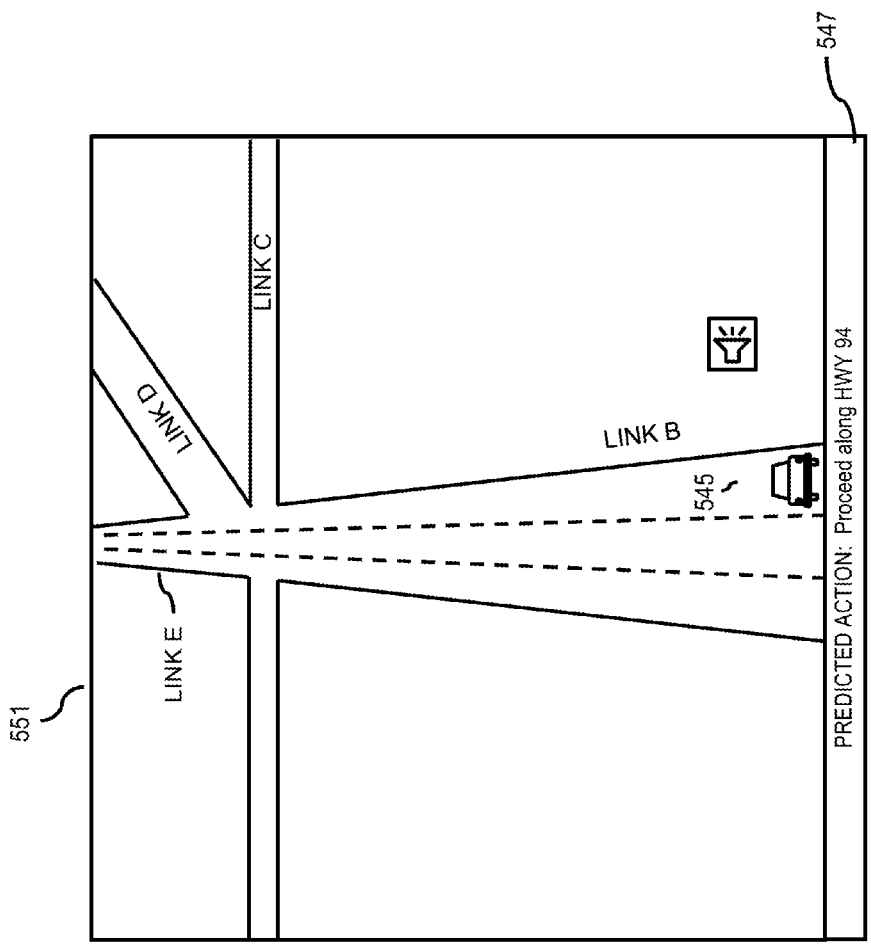
FIG. 5C is a diagram of a user interface for presenting navigation information based on a predicted response of vehicles to the characteristics of a travel path, according to one embodiment.

Once the scores are determined, the prediction platform 103 may utilize the highest scoring behavior and/or response type as a means of enabling a subsequent vehicle traveling towards Node B to "predict" a best fit action to execute. In this case, the best fit action of proceeding along HWY 94 is initiated and/or recommended to the vehicle. In the case of the action being initiated, this corresponds to transmission of an instruction by the platform 103 to a navigation system of the vehicle for execution. In the case of a recommendation, an instruction 547 for the vehicle to proceed along HWY 94 may be rendered to a display 551 of a navigation system, as depicted in FIG. 5C.

In the latter case, mapping information for depicting the location of the car (as an icon 545) relative to the location of impending Links C, D and E are shown to the interface 551. While not shown in this example, the current location of the vehicle 545 corresponds to segment 511, such that the decision points to be executed relative to the exit at Node B is considered and/or determined in advance by the prediction platform 103. Hence, the instruction 547 may be presented in advance of execution of the instruction for the benefit of the driver.

Figure 5D:
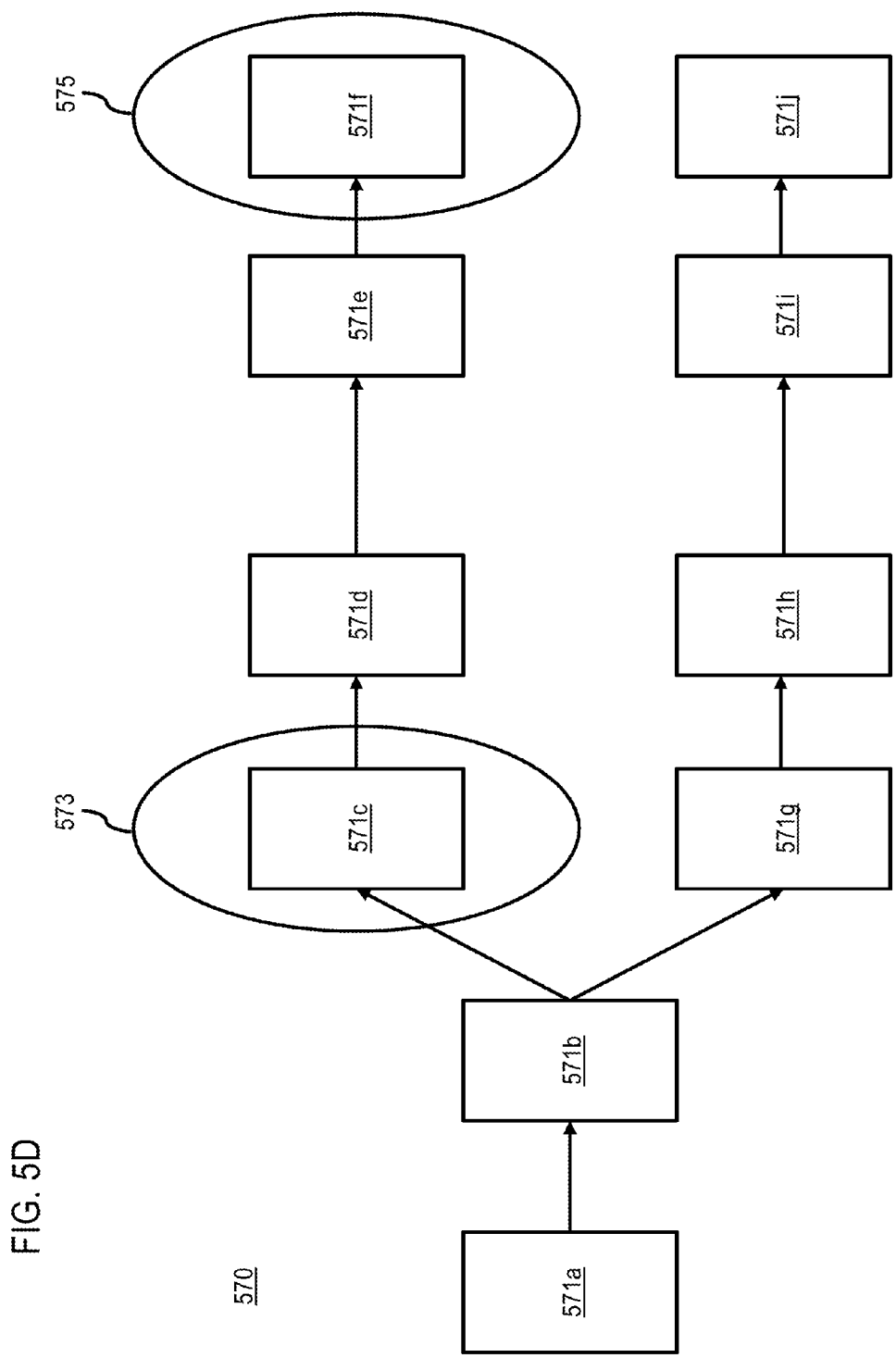
FIGS. 5D and 5E are diagrams of behavior connection link-chains, according to various embodiments.
Figure 5E:
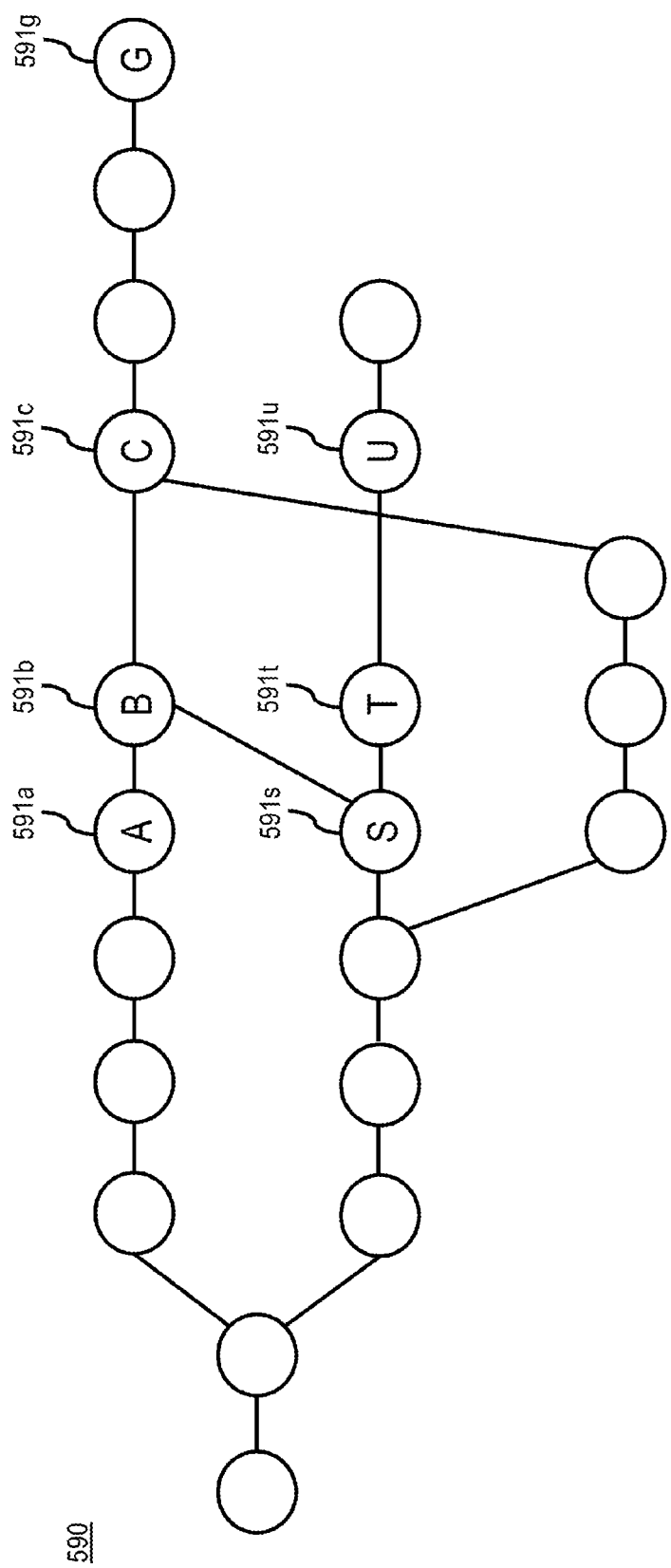

FIGS. 5D and 5E are diagrams of behavior connection link-chains, according to various embodiments. As shown in FIG. 5D a behavior connection link-chain 570 is created based on monitoring driving behavior or driving characteristics of vehicles traveling over a road link chain. However, as previously discussed, although the driving characteristics data underlying the behavior link-chain 570 may be collected with respect to the a given road link chain, the behavior cluster cells 571a-571j (also collectively referred to as behavior cluster cells 571) are defined or linked with respect to each other rather than the road link chain itself. Accordingly, in one embodiment, the connections among the behavior cluster cells 571 are connected using their own network/chain which is independent of the road link chain or road network.

In one embodiment, each behavior cluster cells 571 is associated with respecting behavior types defined, for instance, by a set of driving characteristics derived from pre-driven data. For example, a behavior cluster cell 571 may associated or defined by driving patterns that have a given velocity, acceleration, direction, steering input, etc. In one embodiment, the behavior connection link-chain 570 represents the relationships among the cluster cells 571 (e.g., how each cluster cell 571 is linked with subsequent and/or preceding cells 571, or what behavior leads to another behavior). In one embodiment, the connection between behavior cluster cells 571 is not limited to just the next or preceding behavior, but to a successive or preceding link chain of connected behaviors (e.g., behavior cluster cells 571).

In the example of FIG. 5D, a given behavior (e.g., a given set of driving characteristics) is compared against the driving characteristics of the respective behavior cluster cells 571. In this case, the prediction platform 103 finds a best match 573 of the given behavior to the behavior cell 571c. Then, going forward over the series of link-chain connected behaviors (e.g., through behavior cluster cells 571d-571f), the prediction platform 103 can estimate further and further into the future and reach a predicted behavior 575 associated with the linked behavior cluster cell 571f.

FIG. 5E illustrates a more complex behavior connection link-chain 590, according to one embodiment. As with the example of FIG. 5D, the behavior connection link-chain 590 is generated from pre-driven data. As shown, each circle (some not numbered) in the connection link-chain 590 is a behavior or behavior cluster cell. The example, in particular, highlights the behavior cluster cells 591a-591c and 591a-591u.

In this example, for behaviors, a connection means that pre-driven vehicles that started with a behavior (e.g., behavior 591a (A)), next followed behavior 591b (B) then to behavior 591c (C), and that a behavior 591s (s) is followed by a behavior 591t (T) and then behavior 591u (U), and so on. In one embodiment, the prediction platform 103 has the time history of the pre-driven vehicles, so that the prediction platform 103 knows, for example, that twenty vehicles exhibited behavior 591a. Most of these vehicles then switched to behavior 591b, and none switched to behavior 591t or 591u. Alternatively, ten vehicles instead exhibited behavior 591s, five of these vehicles next changed to behavior 591t and five changed to behavior 591b. Accordingly, the prediction platform 103 can deduce that vehicles with behavior 591s are likely at an unstable driving situation (e.g., because of an even split between the next behaviors 591t and 591b); while vehicles with behavior 591a are stable (e.g., because most vehicles moved to the subsequent behavior), and therefore, the prediction platform 103 can more reliably predict the future behavior all the way to behavior 591g (G).

The processes described herein for predicting driving behavior may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
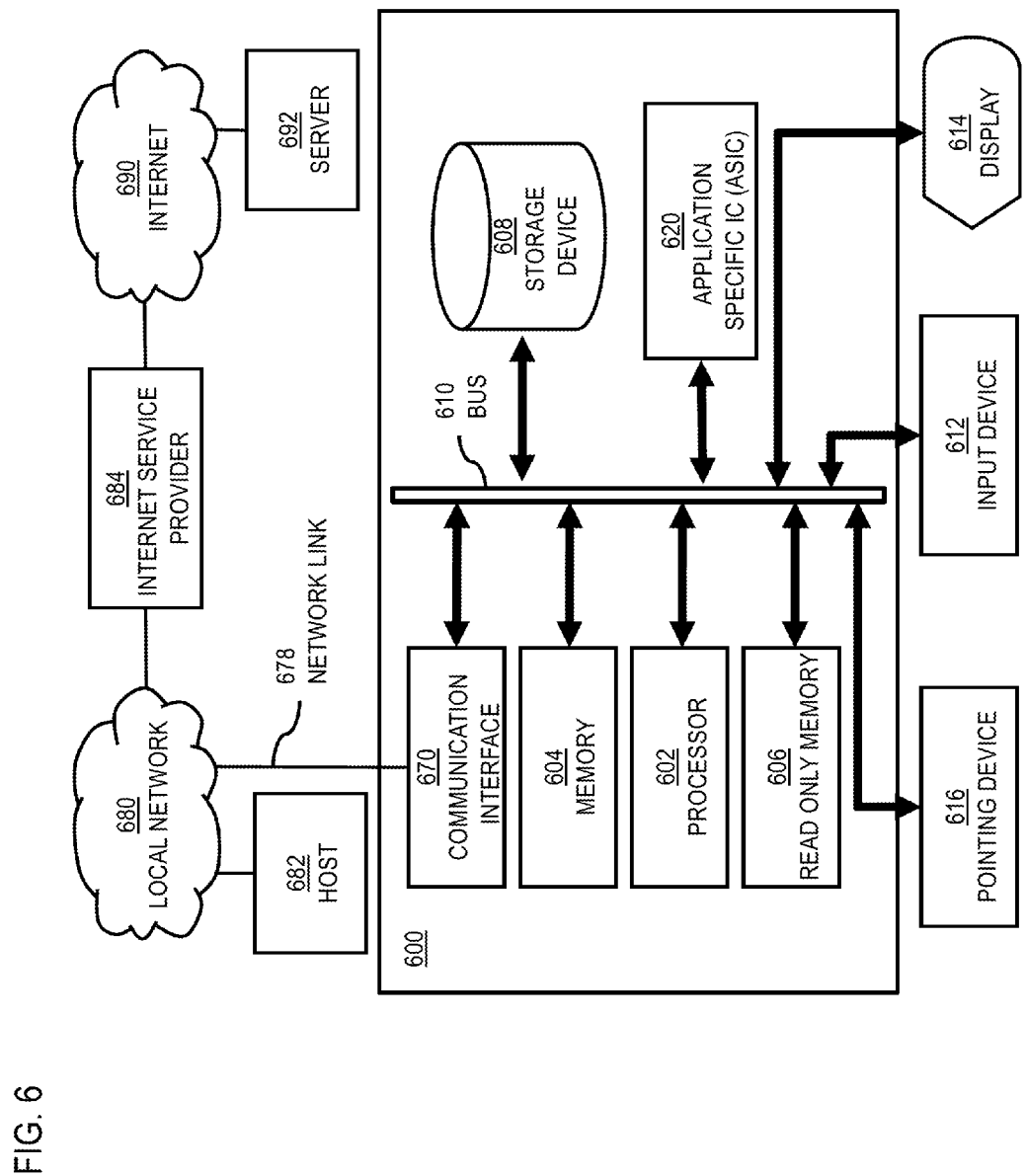
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to predict driving behavior as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of predicting driving behavior.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to predict driving behavior. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for predicting driving behavior. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for predicting driving behavior, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for predicting driving behavior to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to predict driving behavior as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of predicting driving behavior.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to predict driving behavior. The memory 705 also stores the data associated with or generated by the execution of the inventive steps.

Figure 8:
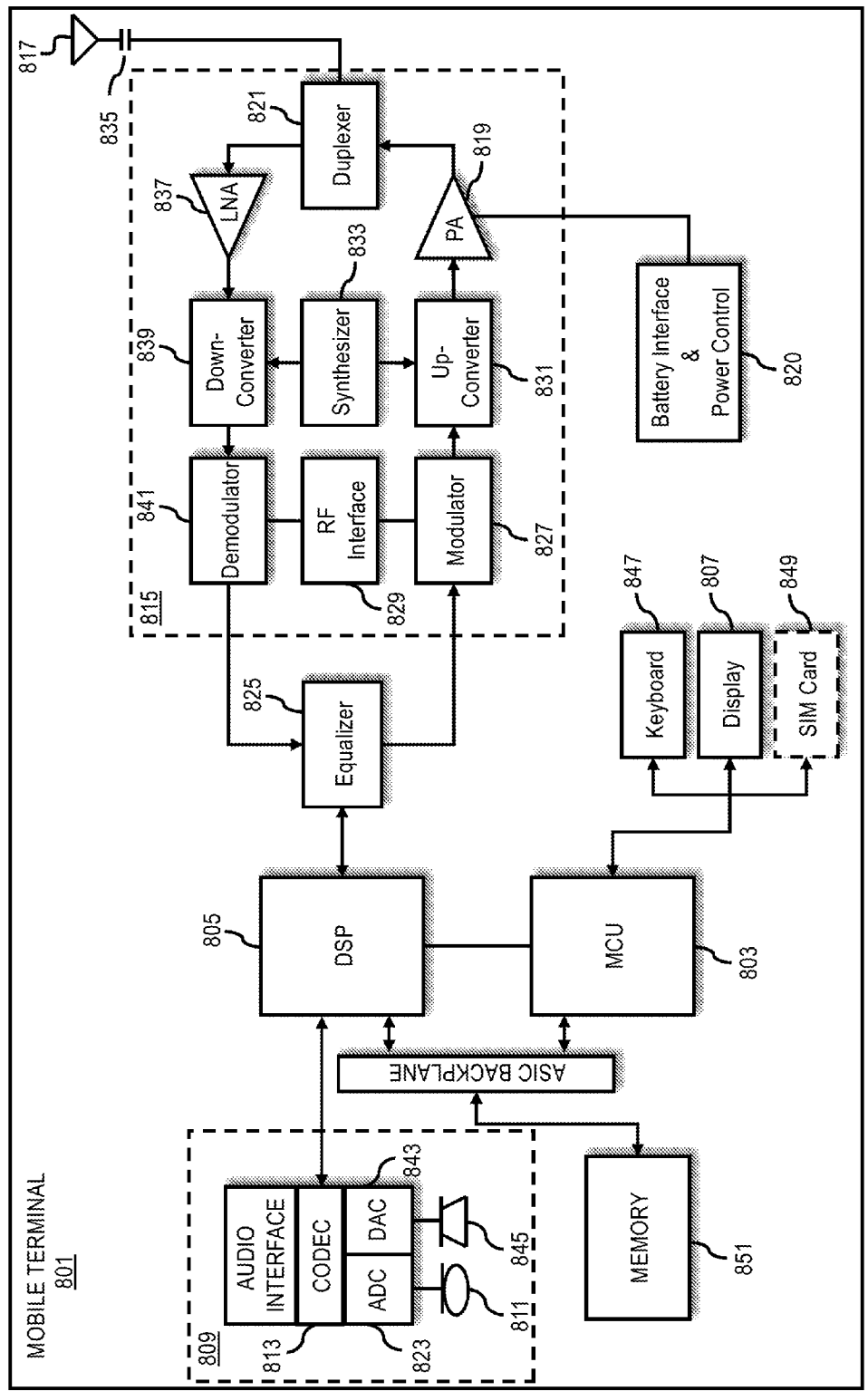
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of predicting driving behavior. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of predicting driving behavior. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to predict driving behavior. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for automated prediction of vehicle driving behaviors, comprising:
   determining, by an apparatus comprising a processor, driving characteristic information for a subject vehicle in association with a plurality of road links each including a sequence of separate segments navigated by a plurality of vehicles based on historic driving actions of the vehicles along the segments, wherein each of the segments is associated with respective one or more behavior cluster cells in-between two points of interest on the respective road link;
   clustering, by the apparatus, the driving characteristic information into response types, behavior types, or a combination thereof with respective probabilities per segment into the one or more behavior cluster cells;

connecting, by the apparatus, one or more of the behavior cluster cells corresponding to a current one of the segments with other one or more of the behavior cluster cells corresponding to a next one of the segments into a behavior connection link-chain mapping to the road links;

traversing, by the apparatus, the behavior connection link-chain and determining one or more predicted behavior types, one or more predicted response types, or a combination thereof for the subject vehicle based, at least in part, on current sensor data collected by one or more sensors mounted on the subject vehicle, without reference to attributes of the segments, wherein the attributes of the segments include speed limits and turn restrictions at intersections; and initiating, by the apparatus, one or more navigation instructions on a user interface based on the one or more predicted behavior types, the one or more predicted response types, or a combination thereof, when the subject vehicle is traveling on the road links.

2. The method of claim 1, further comprising:
selecting a best-fit behavior cluster cell from the behavior connection link-chain based on real-time driving characteristics and a current location of the subject vehicle travelling on the road links, wherein the one or more of the navigation instructions are to be executed by the subject vehicle, by a driver of the subject vehicle, by one or more other vehicles navigating along the road links, by one or more drivers of the one or more other vehicles, or a combination thereof, and wherein at least one of the segments corresponds to at least two behavior cluster cells.

3. The method of claim 2, further comprising:
predicting the next segment to be traveled by the subject vehicle based, at least in part, on the best-fit behavior cluster cell, wherein the one or more navigation instructions include one or more driving instructions, one or more behavior recommendations, or a combination thereof for the driver of the subject vehicle, and the one or more behavior recommendations are based on the one or more predicted behavior types, the one or more predicted response types, or a combination thereof associated with another best-fit behavior cluster cell corresponding to the next segment in the behavior connection link-chain, and wherein the two points of interest include at least one road intersection.

4. The method of claim 3, wherein the one or more predicted behavior types, the one or more predicted response types, or a combination thereof corresponding to the next segment is further based on (a) one or more historical response types associated with the subject vehicle, (b) one or more historical behavior types associated with the subject vehicle, or (c) a combination thereof.

5. The method of claim 3, wherein a navigation system associated with the subject vehicle, the one or more other vehicles, or a combination thereof executes the one or more driving instructions, receives the one or more behavior recommendations, or a combination thereof, and wherein the subject vehicle, the one or more other vehicles, or a combination thereof are autonomous, and wherein the at least two behavior cluster cells include a continuing driving cell and a preparing to stop cell.

6. The method of claim 3, further comprising:
processing location information associated with one or more other vehicles travelling on the current segment to determine one or more nodes, one or more surfaces, or a combination thereof associated with the road links; and determining (a) one or more response types, one or more behavior types, or a combination thereof for the one or more other vehicles associated with the next segment of the road links; (b) one or more other response types, one or more other behavior types, or a combination thereof associated with a segment adjacent to the next segment of the road links; or (c) a combination thereof based on the one or more nodes, the one or more surfaces, or a combination thereof.

7. The method of claim 6, further comprising:
traversing the behavior connection link-chain and determining one or more predicted behavior types, one or more predicted response types, or a combination thereof for the one or more other vehicles approaching the next segment based, at least in part, on (a) the one or more response types, the one or more behavior types, or a combination thereof associated with the next segment; (b) the one or more other response types, the one or more other behavior types, or a combination thereof associated with the current segment adjacent to the next segment; or (c) a combination thereof.

8. The method of claim 1, further comprising:
determining the respective probability for each of the one or more predicted response types, the one or more predicted behavior types, or a combination thereof in the behavior connection link-chain based, at least in part, on respective frequencies of occurrence.

9. The method of claim 1, wherein the one or more predicted behavior types, the one or more predicted response types, or a combination thereof includes a driving maneuver, a vehicle status, a driver status, a vehicle function, or a combination thereof of the subject vehicle.

10. The method of claim 1, wherein the driving characteristic information includes, at least in part, acceleration information, velocity information, heading information, bearing information, orientation information, curvature information, tilt information, steering information, pedal usage information, wiper usage information, headlight usage information, navigation system usage information, stereo system usage information, vehicle state information, or a combination thereof, wherein the attributes of the segments include street names, address ranges, points of interest, geographic features, or a combination thereof.

11. An apparatus for automated prediction of vehicle driving behaviors, comprising:
at least one processor; and
at least one memory including computer program code for one or more programs,
the at least one memory and the computer program code configured to, with the at least one processor, cause the apparatus to perform at least the following,
determine driving characteristic information for a subject vehicle in association with a plurality of road links each including a sequence of separate segments navigated by a plurality of vehicles based on historic driving actions of the vehicles along the segments, wherein each of the segments is associated with respective one or more behavior cluster cells inbetween two points of interest on the respective road link;

cluster the driving characteristic information into response types, behavior types, or a combination thereof with respective probabilities per segment into the one or more behavior cluster cells;

connect one or more of the behavior cluster cells corresponding to a current one of the segments with other one or more of the behavior cluster cells corresponding to a next one of the segments into a behavior connection link-chain mapping to the road links;

traverse the behavior connection link-chain and determining one or more predicted behavior types, one or more predicted response types, or a combination thereof for the subject vehicle based, at least in part, on current sensor data collected by one or more sensors mounted on the subject vehicle, without reference to attributes of the segments, wherein the attributes of the segments include speed limits and turn restrictions at intersections; and initiate one or more navigation instructions on a user interface based on the one or more predicted behavior types, the one or more predicted response types, or a combination thereof, when the subject vehicle is traveling on the road links.

12. The apparatus of claim 11, wherein the apparatus is further caused to:

select a best-fit behavior cluster cell from the behavior connection link-chain based on real-time driving characteristics and a current location of the subject vehicle travelling on the road links, wherein the one or more navigation instructions are to be executed by the subject vehicle, by a driver of the subject vehicle, by one or more other vehicles navigating along the road links, by one or more drivers of the one or more other vehicles, or a combination thereof.

13. The apparatus of claim 12, wherein the apparatus is further caused to:

predict the next segment to be traveled by the subject vehicle based, at least in part, on the best-fit behavior cluster cell, wherein the one or more navigation instructions include one or more driving instructions, one or more behavior recommendations, or a combination thereof for the driver of the subject vehicle, and the one or more behavior recommendations are based on the one or more predicted behavior types, the one or more predicted response types, or a combination thereof associated with another best-fit behavior cluster cell corresponding to the next segment in the behavior connection link-chain, and wherein the two points of interest include at least one road intersection.

14. The apparatus of claim 13, wherein the one or more predicted behavior types, the one or more predicted response types, or a combination thereof corresponding to the next segment is further based on (a) one or more historical response types associated with the subject vehicle, (b) one or more historical behavior types associated with the subject vehicle, or (c) a combination thereof.

15. The apparatus of claim 13, wherein a navigation system associated with the subject vehicle, the one or more other vehicles, or a combination thereof executes the one or more driving instructions, receives the one or more behavior recommendations, or a combination thereof, and wherein the subject vehicle, the one or more other vehicles, or a combination thereof are autonomous, and wherein the at least two behavior cluster cells include a continuing driving cell and a preparing to stop cell.

16. The apparatus of claim 11, wherein the apparatus is further caused to:

determine the respective probability for each of the one or more predicted response types, the one or more predicted behavior types, or a combination thereof in the behavior connection link-chain based, at least in part, on respective frequencies of occurrence.

17. The apparatus of claim 11, wherein the one or more predicted behavior types, the one or more predicted response types, or a combination thereof includes a driving maneuver, a vehicle status, a driver status, a vehicle function, or a combination thereof of the subject vehicle.

18. A non-transitory computer-readable storage medium for automated prediction of vehicle driving behaviors, wherein the storage medium carries one or more sequences of one or more instructions which, and when executed by one or more processors, cause an apparatus comprising a processor the one or more processors to perform:

determining driving characteristic information for a subject vehicle in association with a plurality of road links each including a sequence of separate segments navigated by a plurality of vehicles based on historic driving actions of the vehicles along the segments, wherein each of the segments is associated with respective one or more behavior cluster cells in-between two points of interest on the respective road link;

clustering the driving characteristic information into response types, behavior types, or a combination thereof with respective probabilities per segment into the one or more behavior cluster cells;

connecting one or more of the behavior cluster cells corresponding to a current one of the segments with other one or more of the behavior cluster cells corresponding to a next one of the segments into a behavior connection link-chain mapping to the road links;

traversing the behavior connection link-chain and determining one or more predicted behavior types, one or more predicted response types, or a combination thereof for the subject vehicle based, at least in part, on current sensor data collected by one or more sensors mounted on the subject vehicle, without reference to attributes of the segments, wherein the attributes of the segments include speed limits and turn restrictions at intersections; and initiating one or more navigation instructions on a user interface based on the one or more predicted behavior types, the one or more predicted response types, or a combination thereof, when the subject vehicle is traveling on the road links.

19. The non-transitory computer-readable storage medium of claim 18, wherein the apparatus is further caused to perform:

selecting a best-fit behavior cluster cell from the behavior connection link-chain based on real-time driving characteristics and a current location of the subject vehicle travelling on the road links, wherein the one or more navigation instructions are to be executed by the subject vehicle, by a driver of the subject vehicle, by one or more other vehicles navigating along the road links, by one or more drivers of the one or more other vehicles, or a combination thereof.

20. The non-transitory computer-readable storage medium of claim 19, wherein the apparatus is further caused to perform:

predicting the next segment to be traveled by the subject vehicle based, at least in part, on the best-fit behavior cluster cell, wherein the one or more navigation instructions include one or more driving instructions, one or more behavior recommendations, or a combination thereof for the driver of the subject vehicle, and the one or more behavior recommendations are based on the one or more predicted behavior types, the one or more predicted response types, or a combination thereof associated with another best-fit behavior cluster cell corresponding to the next segment in the behavior connection link-chain, and wherein the two points of interest include at least one road intersection.

* * * * *